United States Patent
Seroussi et al.

(10) Patent No.: US 7,570,782 B2
(45) Date of Patent: Aug. 4, 2009

(54) METHOD AND SYSTEM FOR WATERMARKING

(75) Inventors: Gadiel Seroussi, Cupertino, CA (US); Erik Ordentlich, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 751 days.

(21) Appl. No.: 11/010,035

(22) Filed: Dec. 10, 2004

(65) Prior Publication Data

US 2006/0126891 A1   Jun. 15, 2006

(51) Int. Cl.
*G06K 9/00* (2006.01)
*H04L 9/00* (2006.01)

(52) U.S. Cl. .................. 382/100; 713/176

(58) Field of Classification Search .......... 382/100, 382/166, 232, 233, 234, 235, 240, 243, 244; 380/28, 51, 54, 201, 210, 217, 240, 252, 380/269, 287; 283/72, 74–79, 85, 93, 113, 283/901, 902; 370/527–529; 704/500, 501, 704/503, 504; 705/57, 58; 725/20, 22

See application file for complete search history.

(56) References Cited

U.S. PATENT DOCUMENTS

| | | | | |
|---|---|---|---|---|
| 5,862,260 | A * | 1/1999 | Rhoads | 382/232 |
| 5,901,178 | A * | 5/1999 | Lee et al. | 375/240 |
| 6,957,350 | B1 * | 10/2005 | Demos | 380/203 |
| 7,046,820 | B2 * | 5/2006 | Yu | 382/100 |
| 7,095,874 | B2 * | 8/2006 | Moskowitz et al. | 382/100 |
| 7,177,479 | B2 * | 2/2007 | De Ponti et al. | 382/245 |
| 7,197,368 | B2 * | 3/2007 | Kirovski et al. | 700/94 |
| 7,254,249 | B2 * | 8/2007 | Rhoads et al. | 382/100 |
| 2002/0120849 | A1 * | 8/2002 | McKinley et al. | 713/176 |

* cited by examiner

Primary Examiner—Abolfazl Tabatabai

(57) ABSTRACT

Embedding a watermark includes identifying watermark locations in the data stream, partitioning the identified watermark locations into watermark location blocks each to be embedded with a watermark value portion from the watermark value and altering a predetermined maximum number of data stream values to embed the watermark value portion and introduce no more than a predetermined level of distortion according to a code table. Extracting the watermark bit-sequence includes identifying watermark locations in the data stream, partitioning the identified watermark locations into watermark location blocks each expected to be embedded with a watermark value portion from the watermark value and generating the watermark value by matching each data stream value to a watermark value portion using a code table.

45 Claims, 9 Drawing Sheets

| Index | Derived Ternary Pixel Values | Classes of Watermark Portions | Decimal Class | Index | Derived Ternary Pixel Values | WM Class | Decimal Class | Index | Derived Ternary Pixel Values | Classes of Watermark Portions | Decimal Class | Index | Derived Image Value | Classes of Watermark Portions | Decimal Class |
|---|---|---|---|---|---|---|---|---|---|---|---|---|---|---|---|
| 0 | [0, 0, 0, 0] | [0, 0] | 0 | 9 | [0, 0, 1, 0] | [1, 1] | 4 | 18 | [0, 0, 2, 0] | [2, 2] | 8 | 27 | [0, 0, 0, 1] | [1, 2] | 7 |
| 1 | [1, 0, 0, 0] | [0, 1] | 3 | 10 | [1, 0, 1, 0] | [1, 2] | 7 | 19 | [1, 0, 2, 0] | [2, 0] | 2 | 28 | [1, 0, 0, 1] | [1, 0] | 1 |
| 2 | [2, 0, 0, 0] | [0, 2] | 6 | 11 | [2, 0, 1, 0] | [1, 0] | 1 | 20 | [2, 0, 2, 0] | [2, 1] | 5 | 29 | [2, 0, 0, 1] | [1, 1] | 4 |
| 3 | [0, 1, 0, 0] | [1, 0] | 1 | 12 | [0, 1, 1, 0] | [2, 1] | 5 | 21 | [0, 1, 2, 0] | [0, 2] | 6 | 30 | [0, 1, 0, 1] | [2, 2] | 8 |
| 4 | [1, 1, 0, 0] | [1, 1] | 4 | 13 | [1, 1, 1, 0] | [2, 2] | 8 | 22 | [1, 1, 2, 0] | [0, 0] | 0 | 31 | [1, 1, 0, 1] | [2, 0] | 2 |
| 5 | [2, 1, 0, 0] | [1, 2] | 7 | 14 | [2, 1, 1, 0] | [2, 0] | 2 | 23 | [2, 1, 2, 0] | [0, 1] | 3 | 32 | [2, 1, 0, 1] | [2, 1] | 5 |
| 6 | [0, 2, 0, 0] | [2, 0] | 2 | 15 | [0, 2, 1, 0] | [0, 1] | 3 | 24 | [0, 2, 2, 0] | [1, 2] | 7 | 33 | [0, 2, 0, 1] | [0, 2] | 6 |
| 7 | [1, 2, 0, 0] | [2, 1] | 5 | 16 | [1, 2, 1, 0] | [0, 2] | 6 | 25 | [1, 2, 2, 0] | [1, 0] | 1 | 34 | [1, 2, 0, 1] | [0, 0] | 0 |
| 8 | [2, 2, 0, 0] | [2, 2] | 8 | 17 | [2, 2, 1, 0] | [0, 0] | 0 | 26 | [2, 2, 2, 0] | [1, 1] | 4 | 35 | [2, 2, 0, 1] | [0, 1] | 3 |
| 36 | [0, 0, 1, 1] | [2, 0] | 2 | 45 | [0, 0, 2, 1] | [0, 1] | 3 | 54 | [0, 0, 0, 2] | [2, 1] | 5 | 63 | [0, 0, 1, 2] | [0, 2] | 6 |
| 37 | [1, 0, 1, 1] | [2, 1] | 5 | 46 | [1, 0, 2, 1] | [0, 2] | 6 | 55 | [1, 0, 0, 2] | [2, 2] | 8 | 64 | [1, 0, 1, 2] | [0, 0] | 0 |
| 38 | [2, 0, 1, 1] | [2, 2] | 8 | 47 | [2, 0, 2, 1] | [0, 0] | 0 | 56 | [2, 0, 0, 2] | [2, 0] | 2 | 65 | [2, 0, 1, 2] | [0, 1] | 3 |
| 39 | [0, 1, 1, 1] | [0, 0] | 0 | 48 | [0, 1, 2, 1] | [1, 2] | 7 | 57 | [0, 1, 0, 2] | [0, 1] | 3 | 66 | [0, 1, 1, 2] | [1, 2] | 7 |
| 40 | [1, 1, 1, 1] | [0, 1] | 3 | 49 | [1, 1, 2, 1] | [1, 0] | 1 | 58 | [1, 1, 0, 2] | [0, 2] | 6 | 67 | [1, 1, 1, 2] | [1, 0] | 1 |
| 41 | [2, 1, 1, 1] | [0, 2] | 6 | 50 | [2, 1, 2, 1] | [1, 1] | 4 | 59 | [2, 1, 0, 2] | [0, 0] | 0 | 68 | [2, 1, 1, 2] | [1, 1] | 4 |
| 42 | [0, 2, 1, 1] | [1, 0] | 1 | 51 | [0, 2, 2, 1] | [2, 1] | 5 | 60 | [0, 2, 0, 2] | [1, 1] | 4 | 69 | [0, 2, 1, 2] | [2, 2] | 8 |
| 43 | [1, 2, 1, 1] | [1, 1] | 4 | 52 | [1, 2, 2, 1] | [2, 2] | 8 | 61 | [1, 2, 0, 2] | [1, 2] | 7 | 70 | [1, 2, 1, 2] | [2, 0] | 2 |
| 44 | [2, 2, 1, 1] | [1, 2] | 7 | 53 | [2, 2, 2, 1] | [2, 0] | 2 | 62 | [2, 2, 0, 2] | [1, 0] | 1 | 71 | [2, 2, 1, 2] | [2, 1] | 5 |
| 72 | [0, 0, 2, 2] | [1, 0] | 1 | | | | | | | | | | | | |
| 73 | [1, 0, 2, 2] | [1, 1] | 4 | | | | | | | | | | | | |
| 74 | [2, 0, 2, 2] | [1, 2] | 7 | | | | | | | | | | | | |
| 75 | [0, 1, 2, 2] | [2, 0] | 2 | | | | | | | | | | | | |
| 76 | [1, 1, 2, 2] | [2, 1] | 5 | | | | | | | | | | | | |
| 77 | [2, 1, 2, 2] | [2, 2] | 8 | | | | | | | | | | | | |
| 78 | [0, 2, 2, 2] | [0, 0] | 0 | | | | | | | | | | | | |
| 79 | [1, 2, 2, 2] | [0, 1] | 3 | | | | | | | | | | | | |
| 80 | [2, 2, 2, 2] | [0, 2] | 6 | | | | | | | | | | | | |

METHOD AND SYSTEM FOR WATERMARKING

BACKGROUND OF THE INVENTION

The present invention relates to data compression and watermarking.

In computing, a watermark is typically a bit-sequence that relates to or is associated with other digital content. Unlike printed watermarks consisting of specially printed images or embossed papers, digital watermarks may also correspond to general number sequences, checksums or any other type of digitally transmitted data. Resilient digital watermarks can be used to identify the owner of certain content. These watermarks continue to identify a particular owner despite attempts by an unauthorized third party to remove or alter the content. In contrast, fragile watermarks become unreadable or corrupt when digital content and the underlying watermark are altered. These fragile watermarks ensure the authenticity of certain documents and prevent data tampering from going unnoticed. No doubt, many other uses of digital watermarks exist and will be created in the future.

In most cases, the watermark is transmitted along with an input stream of digital data. If the input stream is not compressed, the watermark can be added to the digital data input stream thereby increasing the overall amount of data being transmitted. Often however, it is desirable to compress this digital data stream thereby increasing the effective network bandwidth during transmission and decreasing storage requirements. One solution is to devise a compression routine that both compresses the input stream and embeds a watermark bit-sequence associated with the watermark.

Adding a watermark to compressed digital data is not particularly difficult when using lossy compression techniques. These lossy compression techniques selectively eliminate certain bits and replace them with the watermark values, or otherwise alter the encoded data to introduce the watermark information. Data loss in the original data stream is caused not only by the lossiness associated with the compression operation but also by the addition of the watermark.

Unfortunately, lossy watermark embedding is particularly unacceptable to users when the underlying compression is lossless. The amount of loss introduced depends a great deal on the specific digital data being compressed and therefore is not easy to predict or limit. Consequently, many lossy techniques for embedding a watermark introduce undesirable distortion to the image as by-product. Users using popular lossless compression methods such as JPEG-LS and its variants expect to have watermark embedding routines available that do not perceptibly distort their images. Moreover, even if the watermarks could be introduced with little or no loss, it is a challenge to ensure that an enhanced decompressor is backward compatible with existing coders and compressed streams. Lack of backward compatibility is one of the more considerable impediments to enhancing lossless compression operations like JPEG-LS to accept watermarks.

BRIEF DESCRIPTION OF THE DRAWINGS

FIG. 6A and FIG. 6B provide a schematic highlighting components provided by JPEG-LS compression and used by implementations of the present invention to embed a watermark;

Like reference numbers and designations in the various drawings indicate like elements.

SUMMARY OF THE INVENTION

Figure 1:
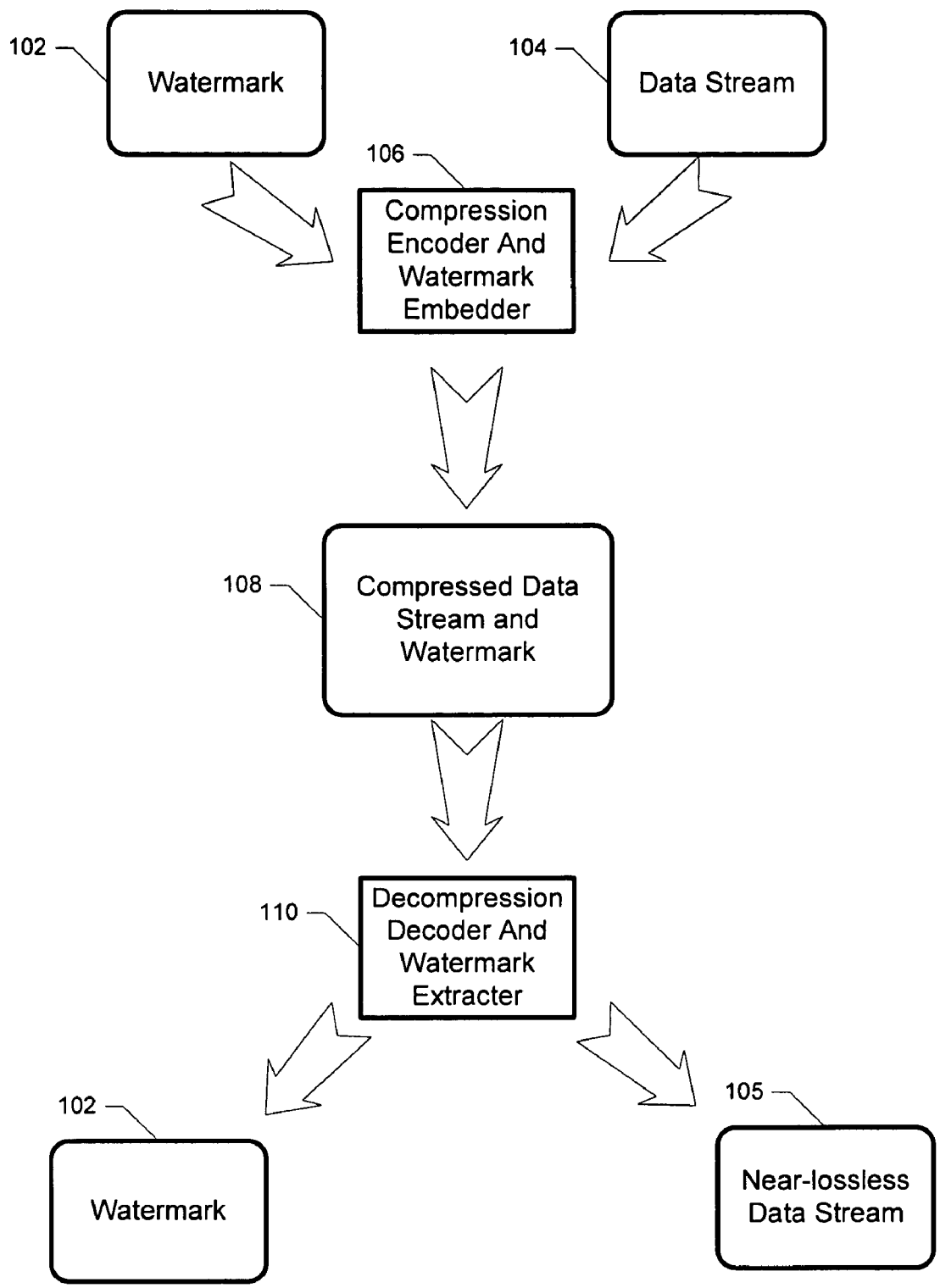
FIG. 1 is a block diagram overview of a system for embedding a watermark in accordance with one implementation of the present invention.

One aspect of the present invention features a method of embedding a watermark value in a data stream of data stream values. The watermark embedding includes identifying a set of watermark locations in the data stream, partitioning the identified set of watermark locations from the data stream into a set of watermark location blocks each watermark location block to be embedded with a watermark value portion from the watermark value and altering a data stream value associated with a predetermined maximum number of watermark locations in one watermark location block to embed the watermark value portion and introduce no more than a predetermined level of distortion according to a code table designed to provide sufficient watermark capacity in the set of watermark location blocks for embedding the watermark value.

Another aspect of the present invention describes a method of extracting a watermark bit-sequence from a data stream. Extracting the watermark bit-sequence includes identifying a set of watermark locations in the data stream, partitioning the identified set of watermark locations from the data stream of data stream values into a set of watermark location blocks each watermark location block expected to be embedded with a watermark value portion from the watermark value and generating the watermark value by matching each data stream value associated with each watermark location block to a watermark value portion using a code table.

DETAILED DESCRIPTION

Aspects of the present invention are advantageous in at least one or more of the following ways. Near-lossless watermark embedding performed in accordance with the present invention introduces imperceptible distortion to the underlying original image or data stream. Carefully controlling both the location and degree of change made to the image or underlying data stream minimizes the distortion or loss introduced when embedding a watermark value. Within an image, watermark locations are carefully selected that are more likely to inherently vary from nearby pixel values. Consequently, changes made to the image or data stream to accommodate the watermark value in these watermark locations are not readily detected by the human eye as the variation introduced appears to be part of the original image.

Watermark location blocks are also used to minimize the impact of distortion introduced as a result of watermark embedding. The watermark location blocks are composed from multiple watermark locations spread throughout the image or data stream. Changes made to an image value or data stream value occurring in the watermark location blocks are distributed throughout an image or data stream rather than located in one area thus further evading detection by the human eye.

Hamming codes are implemented to minimize the changes required to embed a watermark value in one or more of the aforementioned watermark location blocks. Any watermark value portion of a watermark value can be represented by changing at most one image value or data stream value in a given watermark location block. Consequently, the perceived or actual distortion introduced when using the Hamming code table to embed a watermark value portion is minimal as only one image value or data stream value need be altered in the watermark location block. Even if an alternate to the Hamming code is used, the perceived or actual distortion will still be limited to at most a maximum number of image values or data stream values altered when embedding the watermark value portion of the watermark value.

Implementations of the present invention are also computationally efficient. Enhanced encoders and decoders reuse calculations to efficiently process watermarks during both the compression and decompression operations. For example, gradient value calculations used to compress data are reused by implementations of the present invention as part of the process for embedding a watermark value.

For this latter reason, implementations of the present invention work particularly well with the JPEG-LS compression standard or compatible variations. During compression, JPEG-LS already provides gradient values to measure the relative variation among pixels in a context within an image. Gradient values measuring the pixel variation in JPEG-LS are re-used for selecting locations suitable for receiving a watermark value in accordance with implementations of the present invention. On the decoder/decompression side, JPEG-LS once again calculates the gradient values from the pixels in the context thereby making the watermark extraction process also that much easier to perform. In particular, the watermark extraction routine uses a minimum gradient variation threshold produced by JPEG-LS to determine if a particular location in the image or data stream is likely embedded with a watermark portion of the watermark value. JPEG-LS is a compression standard described in ISO 14495-1/ITU Rec. T.87 and also in an article entitled, "The LOCO-I Lossless Image Compression Algorithm: Principles and Standardization into JPEG-LS", IEEE Transactions on Image Processing, Vol. 9, No. 8, August 2000, pp. 1309-1324.

In general principles and teachings of the present invention could be applied to a compression operation or other operation that calculates gradient value for an image or data stream. Of course, if the pixel variation calculations used for the watermark embedding operations are not built into the compression/decompression routines then the gradients can be calculated using a separate process, thread, a separate processor or co-processor, or any other suitable medium available.

Further, while a great deal is described with reference to operating on an image, implementations of the present invention can also be applied to generally work on digital data streams. Describing the embedding of a watermark value in an image is only one example as it is contemplated that the watermark value could be embedded using other digital formats including PCM (pulse code modulation) audio signals. Accordingly, describing aspects of the present invention as embedding a watermark in an image is for convenience and should not construed to limit application of the present invention to other digital domains available for embedding a watermark value.

FIG. 1 is a block diagram overview of a system for embedding a watermark in accordance with one implementation of the present invention. System 100 includes a watermark 102 having a corresponding watermark value, a data stream 104 having multiple data stream values, a near-lossless data stream 105 with corresponding data stream values produced as the output after decompression, a compression encoder and watermark embedded 106 (hereinafter compression encoder 106), a compressed data stream and watermark 108 and a decompression decoder and watermark extractor 110 (hereinafter decompression decoder 110).

Unlike a lossy data stream, near-lossless data stream 105 differs from the original data stream by no more than a prespecified or predetermined amount. This is in contrast to the popular yet lossy JPEG standard that does not have a maximum predetermined amount of loss incurred during compression. Compared to these lossy standards, the watermark capacity of the datastream in a near-lossless compression can be increased or decreased by implementations of the present invention by increasing or decreasing a predetermined level of loss or distortion to be introduced into the data stream. If a lower watermark capacity is acceptable, the level of loss or distortion is set to a lower predetermined level of distortion generally too small to be perceived by the human senses. For example, one implementation of the present invention embeds a watermark value without altering a given value in the data stream by more than one unit within the particular domain of representation. This could mean that a single pixel value in an image is not altered by more than one intensity level. Alternatively, a data stream representing pulse code modulated (PCM) digital audio information might be modified in such a way to only alter the amplitude of a representative sound or frequency by one unit of loudness or volume.

It is also possible to increase the watermark capacity by increasing the number of locations available to embed the watermark value. In JPEG-LS, a minimum gradient threshold measuring the variation of image values in an image can be set to a lower level thus increasing the number of locations available for embedding the watermark value. For example, a lower minimum gradient threshold allows areas of an image with lower pixel activity or variation to be used for watermark locations in addition to areas of the image having a higher degree of activity or variation. Lowering the minimum gradient threshold also potentially increases the distortion introduced when embedding the watermark value and therefore must also be considered. Further details on the trade-offs between watermark capacity and distortion are described later herein.

In general, watermark 102 contains additional information to be sent along with data stream 104 in the form of a watermark value. The watermark value in watermark 102 is not limited to carrying visual information or pictures but instead includes any information susceptible to digital encoding. In general, the watermark value can be any type of digital data and is not limited to a specific data format or type of content. For example, watermark 102 can be a numeric sequence used for coding, a sequence of check digits for the input data, audio information, video-streaming data, digital images, metadata or any other information to be used in conjunction with the data stream 104.

Data stream 104 represents data stream values being compressed in real-time. Data stream values in data stream 104 include any information susceptible to digital encoding including, but not limited to, those examples previously described. In one implementation, data stream 104 represents a digital image and compression encoder 106 is compatible with JPEG-LS or other compression operations considered to be in a similar class as JPEG-LS. Implementations of the present invention can be readily applied to JPEG-LS for the near-lossless embedding of watermarks in a compressed data stream.

Accordingly, in one implementation of the present invention data stream 104 is compressed using compression encoder 106 in accordance with JPEG-LS compression and its variants. The image is compressed using run mode compression, end of run (EOR) mode compression and regular mode compression with variable length codewords. During regular mode compression, implementations of the present invention consider the suitability of locations in data stream 104 for watermark embedding depending on the context and activity of values in a region. As described in further detail later herein, JPEG-LS already provides a context indicating the activity of pixels in an image during regular mode compression thus making the watermark embedding operation quite efficient.

For example, locations in data stream 104 containing pixel values that vary beyond a minimum gradient variation threshold are identified as candidates for embedding watermark 102. Changes made to the underlying pixel values in these high variation locations of data stream 104 are generally imperceptible to the human eye if done in accordance with implementations of the present invention. One implementation of the present invention alters a characteristic associated with a pixel such as pixel intensity. The pixel intensity from one watermark location in data stream 104 can be altered by as little as one unit to embed a watermark portion of the overall watermark value. This small change combined with careful location selection minimizes the perceived lossiness in near-lossless data stream 105.

Compressed data stream and watermark 108 contains a compressed version of data stream 104 and watermark 102 embedded in accordance with implementations of the present invention. Storage devices (i.e., CD-ROM, DVD) and networks can be used to transmit compressed data stream and watermark 108 as required by the particular application or need. As will be described in further detail later herein, the embedded watermark is generally considered fragile and can also be used to readily detect if the compressed data stream has been altered. Many other applications of the present invention are also contemplated in the areas of content storage and/or transport.

Decompression decoder 110 implemented in accordance with the present invention both extracts embedded watermark 102 and decompresses near-lossless data stream 105. Watermark 102 is extracted efficiently during decompression as the context indicating pixel activity is also provided by the decompression operation. For example, JPEG-LS provides one or more gradient values during compression that are compared against a minimum gradient variation threshold during watermark extraction.

Even when using a lossless compression/decompression like JPEG-LS, the watermark embedding operation transforms data stream 104 into near-lossless data stream 105 as a result. If for some reason watermark 102 is not embedded, data stream 104 is not altered and near-lossless data stream 105 is in fact actually lossless. Nonetheless, a decoder enhanced in accordance with the present invention will not reject the data stream 104 as invalid and will instead extract "all zeros" for watermark 102.

It is important to recognize that implementations of the present invention remain backward compatible with the unenhanced or conventional decompression decoders. Conventional decompression decoders can continue to process compressed data stream and watermark 108 using regular mode decompression. Instead of rejecting the stream as invalid or stopping, the conventional decompressor is unaware of the potential existence of watermark 102 and decompresses near-lossless data stream 105 without issue.

Figure 2:
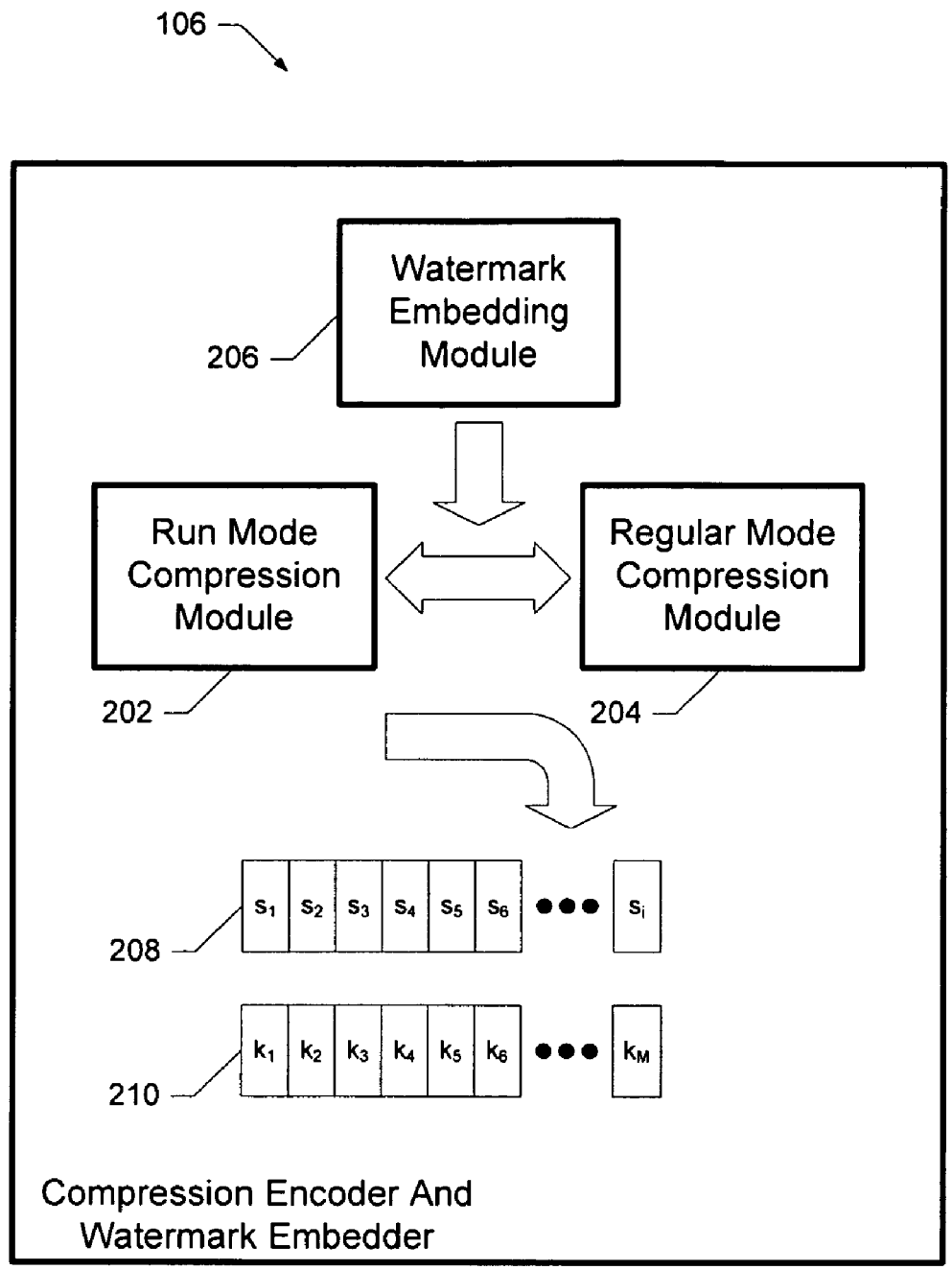
FIG. 2 is a schematic illustration of the watermark embedding performed in accordance with the present invention.

FIG. 2 is a schematic illustration of the watermark embedding performed in accordance with the present invention. This schematic illustration includes a run mode compression module 202, a regular mode compression module 204, a watermark embedding module 206, a secret data key 208 and a binary pseudo-random sequence 210. Run mode compression module 202 and regular mode compression module 204 are used by a class of compression operations that compress images and other similar data streams in two modalities: a run mode compression and a regular symbol by symbol driven compression mode (i.e., regular mode). In the case of JPEG-LS, the regular mode compression further includes an end of run (EOR) sub-mode for transitions between the run mode compression and regular mode compression operations. JPEG-LS is one compression operation that combines use of a run mode and a regular mode for compression. The EOR sub-mode is distinguished from regular mode in JPEG-LS as the codeword sent in EOR sub-mode occurs immediately after the run is complete and is compressed differently.

As previously described, implementations of the present invention embed a watermark using one or more features available in regular mode compression module 204. For example, regular mode compression in JPEG-LS determines the locations likely to have pixel variation in an image as one of the steps used during the compression operation. The pixel variation determination in JPEG-LS is reused in accordance with implementations of the present invention to also identify watermark locations in the data stream to embed a watermark value. In the case of JPEG-LS and its variants, regular mode compression module 204 provides one or more gradient values taken from a context and indicating a degree of pixel variation in the image. The context is calculated in JPEG-LS by moving a template over an image measuring the change in pixel values passing under the template. These gradient values are important as watermarks embedded in locations of high pixel variation are not easily detected or perceived by the human eye even though the watermark operation generally introduces a slight loss into the image.

Lossiness is also reduced by grouping the watermark locations together into blocks and limiting the modifications to a single location in each block. The watermark location blocks are composed from multiple watermark locations spread throughout the image or data stream. Multiple watermark locations are used to represent a watermark value portion instead of using a single watermark location. For example, data stream values from four different watermark locations making up the watermark location block are embedded with a watermark value portion of the watermark value.

Implementations of the present invention use a Hamming code table to ensure at most only one data stream value in each watermark block is modified to embed the watermark value portion. By way of the Hamming code table, any watermark value portion can be represented by changing only one data stream value in the watermark location block. This restricts modifications to the data stream for the watermark embedding operation to fewer locations in the data stream or image. Details on these features and operations are provided in further detail later herein.

Secret data key 208 is used to keep the embedded watermark values less readily detected by unauthorized users. In one implementation, secret data key(s) 208 is a shared secret key available to both an encoder and decoder designed in accordance with the present invention. In one implementation, secret data key 208 is a seed used to generate a binary pseudo-random keying sequence (k) 210 which, in turn, is used to determine the watermark locations for receiving the overall watermark value.

Essentially, secret data key 208 is expanded to ensure binary pseudo-random keying sequence 210 identifies a sufficient number of watermark locations required for embedding the watermark value. For example, secret data key 208 can be expanded by the repeated application of SHA-1, MD5 or other cryptographic hash function. The resulting binary pseudo-random keying sequence 210 has a bit in the sequence set to a '1' value indicating the corresponding potential watermark location in the data stream or image can be used in a watermark location block and possibly embedded with a watermark value portion of the watermark value. The subset of watermark locations actually used to embed the watermark value portions forms a set of effective watermark locations as they contain the actual watermark value. Alternatively, secret data key 208 can be used directly for watermarking without further expansion. For example, this would require secret data key 208 to have at least a sufficient number of bits to identify the set of effective watermark locations described previously.

Those watermark locations not identified as part of the effective watermark locations can also be used to avoid detection of the watermark. A random value can be inserted in a watermark location corresponding to an entry in binary pseudo-random keying sequence 210 having a '0' value. This approach increases the difficulty identifying the watermark without secret data key 208 or binary pseudo-random keying sequence 210 as the watermark locations are either filled with an actual watermark value portion or random data. Consequently, unauthorized users are less likely to detect patterns or other redundancies transmitted in the compressed data stream and determine the watermark value. This helps keep the watermark secret even from users operating a decompressor enhanced in accordance with implementations of the present invention.

Figure 3:
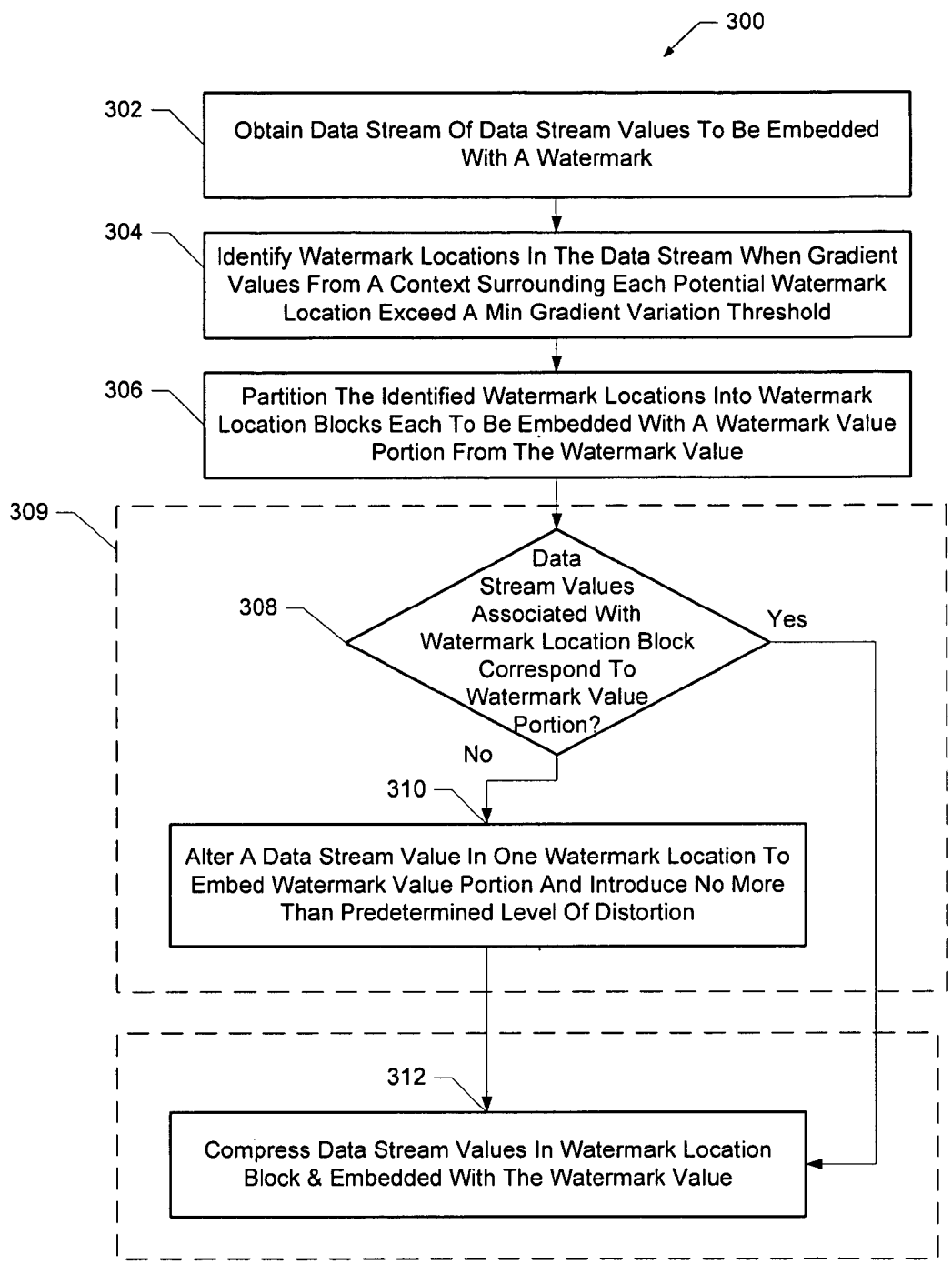
FIG. 3 is a flowchart diagram providing a compression and watermark embedding operation in accordance with one implementation of the present invention.

FIG. 3 is a flowchart diagram providing compression and watermark embedding operation 300 in accordance with one implementation of the present invention. While these operations are designed around JPEG-LS and its variants, it can also potentially be applied to other compression operations having a regular mode compression.

Initially, the compression encoder of the present invention obtains a data stream of data stream values to be embedded with a watermark (302). In the case of JPEG-LS, the watermark embedding occurs during the compression operation as the watermark embedding reuses the gradient value calculations performed by the JPEG-LS compression operation. Alternatively, the gradient value calculations could be performed separately from the compression operation if a compression operation, unlike JPEG-LS, does not already provide these computations.

Implementations of the present invention then identify watermark locations in the data stream when gradient values from a context surrounding each potential watermark location exceed a minimum gradient variation threshold (304). In the regular compression mode of JPEG-LS, a causal template gathers the context from surrounding pixel values to predict the value of a pixel being compressed. A set of gradient values derived from this template passing over a region of an image also indicates the variation or activity in the data stream and helps determine if the location of the pixel being compressed is a candidate for embedding a watermark value.

Depending on the minimum gradient variation threshold and the gradient values produced above, implementations of the present invention determines which, if any, of the locations in the image should be embedded with one or more watermark portions from the watermark value. For example, the minimum gradient variation threshold in JPEG-LS can be selected from a set of quantized values ranging in magnitude from 1 to 4. Selecting a minimum gradient variation threshold with a higher magnitude excludes locations in the data stream having gradient values lower in magnitude. Conversely, lowering the minimum gradient variation threshold required increases the potential for more watermark locations in the data stream as more locations in the data stream are likely to have gradient values higher in comparison.

It is important to note that lowering the minimum gradient variation threshold increases the watermark capacity and the potential for more distortion in the data stream or image. The minimum gradient variation threshold is inversely proportional to the level of distortion. If this minimum gradient variation threshold is lowered, watermarks are not only embedded in very active areas of an image but also in less active areas of the image. Consequently, the minimum gradient variation threshold sets the degree of tradeoff between the watermark capacity of an image or data stream and the overall amount of distortion introduced in the image or data stream. In general, the minimum gradient variation threshold should be set no lower than needed to embed the watermark value and high enough to ensure the level of distortion introduced into the data stream or image by the embedded watermark is acceptable or likely to go unnoticed.

As an added measure, implementations of the present invention reduce the apparent lossiness by embedding the watermark value over several watermark locations in the image. Implementations of the present invention partition the identified watermark locations into watermark location blocks each to be embedded with a watermark value portion from the watermark value (306). Each watermark location block is composed of numerous watermark locations in the image. For example, one implementation groups together four watermark locations into a watermark location block to be embedded with and represent a watermark portion value. In one implementation, the watermark portion includes two ternary digits from a ternary representation of the watermark value. These data stream values in the watermark location block embed the watermark portion using modulo-3 arithmetic and cross referencing entries in a Hamming code table. As will be described in further detail later herein, alternate implementations can generally use modulo-Q arithmetic and Q-ary values and are not limited to modulo-3 arithmetic and ternary representations.

Next, implementations of the present invention may need to alter a data stream value to embed the desired watermark value portion of the watermark value. (309). Initially, a comparison is made to determine if the data stream values associated with the watermark location block already correspond to the watermark value portion (308). While not typically the case, it is possible that the watermark location block contains data stream values that coincidentally already represent the watermark value portion to be embedded. One implementation of the present invention has a code table that maps derived data stream values from the watermark location block to different watermark value portions. These derived data stream values are the residue of the data stream values taken from the watermark location block modulo Q. For example, one implementation uses a Hamming code table that cross references one or more possible derived data stream values to one or more classes of watermark value portions. If the derived data stream values in the watermark location block match the class corresponding to the particular watermark value portion then the watermark value portion is already represented. Consequently, implementations of the present invention may optionally proceed to compress the data stream values associated with the watermark location block without any further alteration (312). For example, the compression can be performed in accordance with JPEG-LS as described in further detail later herein.

Alternatively, it is also possible that the data stream values in the watermark location block do not correspond to the watermark value portion to be embedded. If this occurs, one implementation of the present invention alters a data stream value in one watermark location of the watermark location block and introduces no more than predetermined level of distortion (310). As previously mentioned, the Hamming code table used in one implementation associates classes of watermark value portions with multiple different derived data stream values. A different watermark value portion can be represented according to the Hamming code table by changing the value of a data stream value associated with one watermark location within the watermark location block by a predetermined number of units. For example, to embed a portion of a ternary watermark value in an image it may only be necessary to alter one pixel value by one unit of intensity in a watermark location in one watermark location block. In this example, altering the single pixel value or other data stream value in the data stream by one unit is sufficient to embed a watermark value portion yet results in distortion that is relatively imperceptible to the human eye. As will be described in further detail later herein, alternate implementations may require changing an image or data stream value by more than one unit if the watermark value portion is represented in higher than a ternary base.

It is contemplated that using a code table with a watermark location block of length n allows for embedding more information per block compared with using a fixed decimation from every n-th watermark location. For example, each watermark location block using a second order ternary Hamming code of length n=4 is capable of embedding a watermark value portion of two ternary digits. In contrast, the fixed decimation alternative using every n-th watermark location would embed only one ternary digit.

If keying is also utilized, it is possible to embed the actual watermark value in only the effective watermark locations and then potentially fill the balance of the watermark locations with random data. As previously described, the set of effective watermark locations include those watermark locations indicated by a pseudo-random sequence and derived from a secret key. In one implementation, all watermark locations not indicated by the pseudo-random sequence are instead embedded with a random "pseudo-watermark," or just with random data. In this context, the random data can be embedded into the balance of these watermark locations also using a blocking scheme and code table described previously with respect to the effective watermark locations. Consequently, if keying is implemented it is assumed that the set of watermark location blocks are created from the set of effective watermark locations rather than the complete set of watermark locations as previously described.

Figure 4:
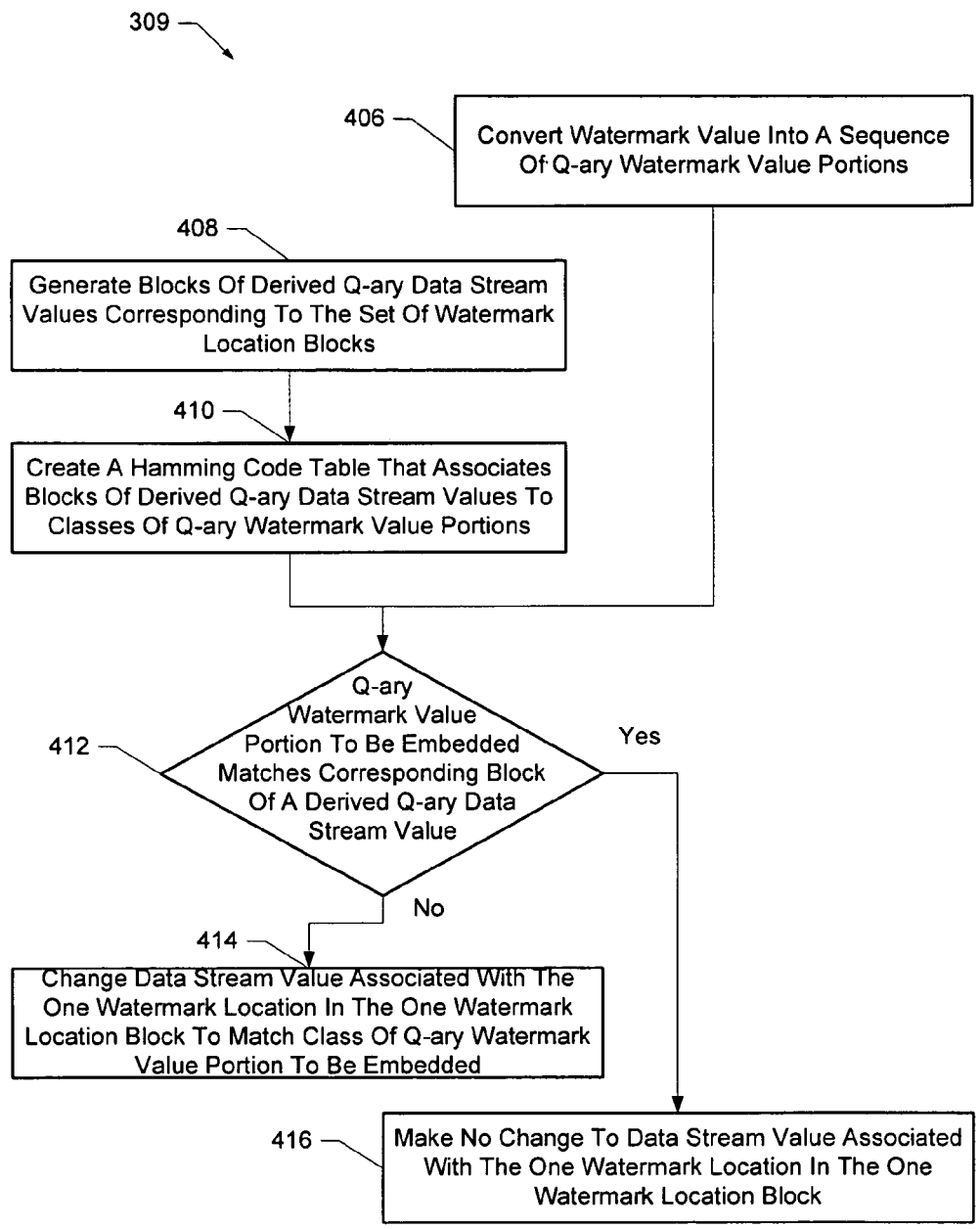
FIG. 4 is a flowchart diagram of the operations used to embed a watermark value using a code table in accordance with implementations of the present invention.

FIG. 4 is a flowchart diagram of the operations used to embed Q-ary watermark value portions using a code table in accordance with implementations of the present invention. This further details step 310 in FIG. 3 for altering the value of a watermark location and describes the more general case. Q represents the size of the alphabet used in each digit of the Q-ary watermark value and the Q-ary watermark value portion is just one part of the Q-ary watermark value. For example, if Q=3 then a ternary watermark value and a ternary watermark value portion are used.

Initially, implementations of the present invention convert a watermark value into a sequence of Q-ary watermark value portions (406). For example, when Q=3 a watermark value in binary is converted into a ternary watermark value and then divided into multiple ternary watermark value portions to be embedded into the data stream values from multiple watermark location blocks.

Next, implementations of the present invention generate blocks of derived Q-ary data stream values corresponding to the set of watermark location blocks by taking residues of the data stream values modulo Q (408). These blocks of derived Q-ary data stream values guide how, if at all, the corresponding data stream values in the set watermark location blocks should be altered.

When Q=3, implementations of the present invention embed a ternary watermark value and ternary watermark value portions into the data stream values from the set of watermark location blocks. However, the value of Q can be set to a number of other values including: 2, 4, 5, 7, 8, 9, 11, 13, other prime values, or powers of prime values. Increasing the value of Q increases the watermark capacity but also changes the amount of potential distortion for a given data stream value when embedding the Q-ary watermark value. In particular, the level of distortion and the watermark capacity is directly proportional to the size of an alphabet having Q symbols. Thus, the value of Q is generally set to a large enough value to ensure the watermark capacity in the set of watermark location blocks is sufficient to embed the watermark value in the data stream yet not large enough to introduce unacceptable levels of distortion in the data stream. Further, it is contemplated that the parameter Q need not be modified alone and instead can be adjusted along with other parameters such as the watermark location block length, to optimize the capacity-distortion trade-off. One measure of the level of distortion is expressed in the units used to measure at least one characteristic of a data stream value in the data stream. For example, a maximum distortion is measured as follows:

$$\text{Level of distortion} = \left\lceil \frac{Q-1}{2} \right\rceil,$$

Where $\lceil x \rceil$ denotes the smallest integer not smaller than x.

For example, the level of distortion is limited to one (1) unit of a data stream value when Q=3. This unit of measurement can increase or decrease the pixel intensity of an image value by one unit or changing a pulse code modulation (PCM) amplitude associated with an audio sample by one unit as well.

Next, one embodiment of the present invention creates a Hamming code table that associates blocks of derived Q-ary data stream values to classes of Q-ary watermark value portions (410). Once again, the order of the Hamming code table selected is related to the watermark capacity hence the order of the Hamming code (m) is set to a small enough value to ensure the watermark capacity in the set of watermark location blocks is sufficient to embed the watermark value. Higher order Hamming code tables decrease both distortion and capacity, providing a convenient control over a distortion-capacity trade-off. The number of derived Q-ary data stream values in each block of derived Q-ary datastream values corresponds to Q raised to an order of the Hamming code (m) less one and divided by Q−1 or as follows:

$$\text{Derived } Q\text{-ary Data Stream Values Per Block} = \frac{(Q^m - 1)}{Q - 1}$$

Further, these Q-ary Data Stream Values in each watermark location block are capable of conveying Q raised to the order of the Hamming code ($Q^m$) different possible classes of Q-ary watermark portions.

For example, if Q is three (Q=3) and a second order ternary Hamming code (m=2) is used then a Hamming code table uses blocks of 4 derived ternary data stream values to convey nine (9) different classes of ternary watermark portions while introducing a predetermined level of distortion associated with changing at most one ternary datastream value per block by no more than one unit. However, if Q is three (Q=3) and a third order ternary Hamming code (m=3) is used then a Hamming code table uses blocks of 13 derived ternary data stream values to convey twenty-seven (27) different classes of ternary watermark portions while introducing a predetermined level of distortion associated with changing at most one ternary datastream value in each block by no more than one unit.

To complete the operation, implementations of the present invention then compare the Q-ary watermark value portion to be embedded with the corresponding block of derived Q-ary data stream values, by way of the Hamming code table (412). The result of the comparison determines how, if at all, a data stream value in the watermark location block needs to be altered. For example, no data stream value needs to be altered (416) if the block of derived Q-ary data stream values matches the class of the Q-ary watermark value portion to be embedded.

A data stream value from the watermark location block is changed when the comparison does not yield a match. In particular, implementations of the present invention change a data stream value associated with the one watermark location in the one watermark location block to match the class of the Q-ary watermark value portion to be embedded (414). Forcing the data stream value to match the class of the Q-ary watermark value portion requires changing one location at most in the block of watermark locations due to the relationships established by the Hamming code table. Moreover, the level of distortion is also limited by the value of Q or the number of symbols used by the alphabet representing the watermark value and watermark value portions.

Figure 5:
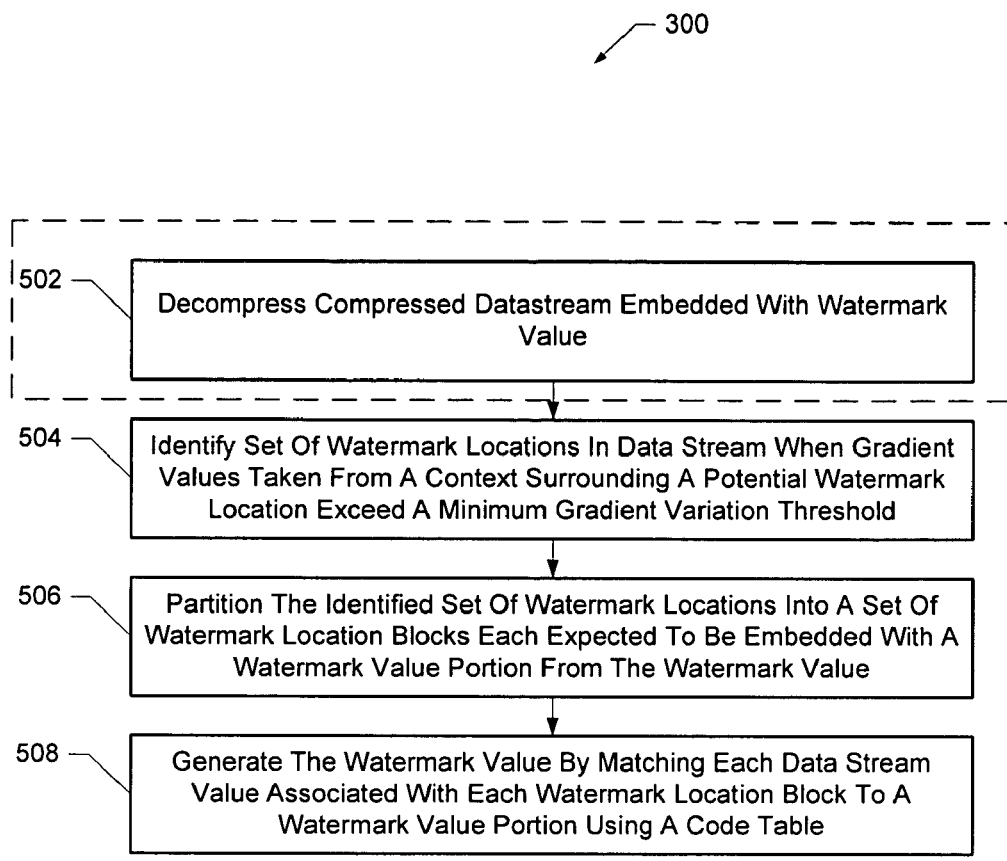
FIG. 5 is a flowchart diagram of the operations for extracting the watermark value from a data stream compressed in accordance with the present invention.

FIG. 5 is a flowchart diagram of the operations for extracting the watermark value from a data stream compressed in accordance with the present invention. In one implementation, the operation begins by decompressing a data stream already embedded with a watermark value (502). In one implementation, JPEG-LS is also used to also decompress the data stream or image embedded with the watermark value. JPEG-LS provides gradient values and a minimum gradient variation threshold used by both the decompression and watermark extraction operations. Accordingly, this makes it possible to decompress the data stream values using JPEG-LS and extract the watermark value in parallel-like manner using implementations of the present invention. Of course, in the event the datastream is not compressed, the decompression operation is optional and not required to extract the embedded watermark value.

Like the watermark embedding operation, implementations of the present invention also identifies set of watermark locations in the data stream when gradient values taken from a context surrounding a potential watermark location exceed a minimum gradient variation threshold (504). Similar to the compression operation, the regular decompression mode of JPEG-LS uses a causal template to gather the context from surrounding pixel values and predict the value of a compressed pixel. A set of gradient values derived from this template passing over a region of a data stream or an image also indicates the variation or activity in the data stream and helps determine if the location of the pixel being compressed is likely to have an embedded watermark value.

Depending on the minimum gradient variation threshold and the gradient values produced above, implementations of the present invention determine which, if any, of the locations in the data stream are likely to be embedded with one or more watermark portions from the watermark value. To make this determination accurately, however, the parameters and thresholds set during the decompression/watermark extraction need to be set to the same levels during the compression/watermark embedding operation. For example, the minimum gradient variation threshold in JPEG-LS can be one of four different quantized values ranging in magnitude from 1 to 4. The watermark extraction operation needs to select the same minimum gradient variation threshold used during the watermark embedding operation to ensure that the same watermark locations are properly identified.

Additionally, implementations of the present invention then partition the identified set of watermark locations into a set of watermark location blocks. Each watermark location block is expected to be embedded with a watermark value portion from the watermark value (506). The size of the watermark location block used to identify these watermark value portions also must be the same in both the watermark embedding and watermark extraction components. For example, every 4 watermark locations is a watermark location block potentially embedded with a watermark value portion when using a second order Hamming code table (m=2).

Implementations of the present invention then generate the watermark value by matching each data stream value associated with each watermark location block to a watermark value portion using a code table (508). The watermark extraction operation and parameters operate on similar principles as the watermark embedding operation described previously. Initially, the extraction operation generates blocks of derived Q-ary data stream values from the set of watermark location blocks by taking residues of the corresponding data stream values modulo Q. Once again, Q represents an alphabet having Q symbols. For example, when Q=3 a derived ternary data stream of values uses an alphabet of {0,1,2} or {−1,0,1}.

If it is not already created, implementations of the present invention create a Hamming code table that associates blocks of derived Q-ary data stream values to classes of Q-ary watermark value portions. For example, a second order Hamming code table (m=2) with Q=3 provides blocks of 4 derived ternary data stream values ranging from 0 to 80 in decimal. These blocks of 4 derived ternary data stream values are cross-referenced in the Hamming code table to ternary watermark value portions represented as a pair of ternary digits or trits. These pairs of ternary digits represent 9 different classes of watermark value portions enumerated in decimal from 0 to 8. As the one or more Q-ary watermark value portions are eventually extracted and combined together into the watermark value.

Figure 6B:
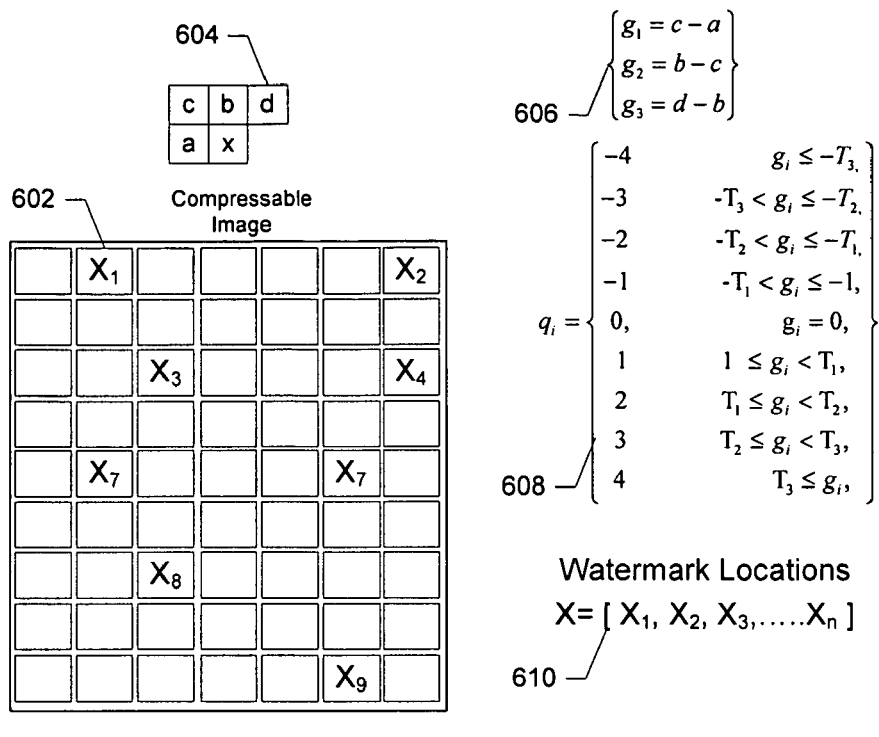
Figure 6B:
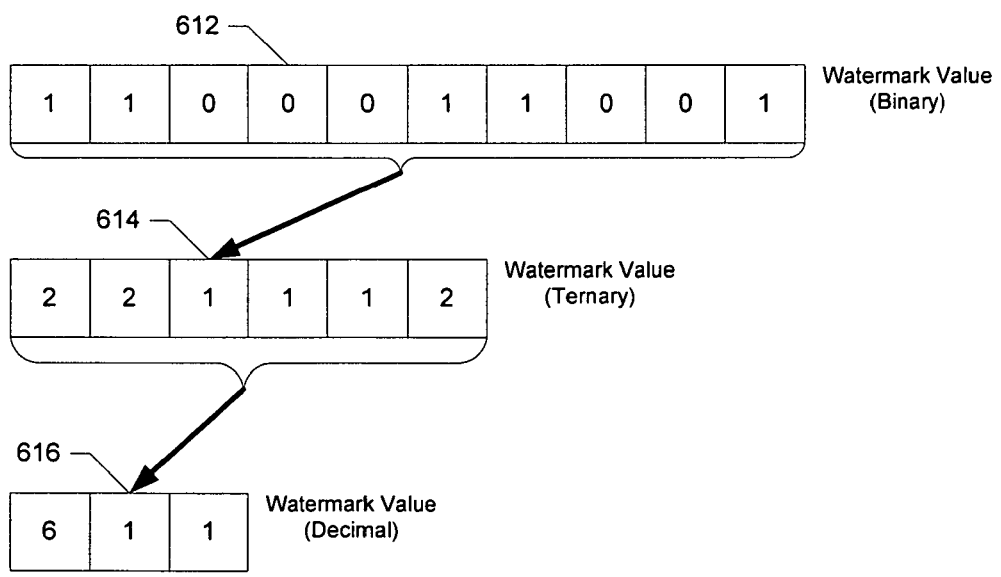

FIG. 6A and FIG. 6B provide a schematic highlighting components provided by JPEG-LS compression and used by implementations of the present invention to embed a watermark. In this example, image 602 is the data stream to be compressed using JPEG-LS by way of a template 604. Template 604 moves over image 602 in scan order during JPEG-LS compression producing gradient values 606 and quantized gradient values 608. Template 604 produces a context for pixel "x" by way of surrounding pixels "a", "b", "c" and "d" positioned relative to "x" and as indicated by template 604. These surrounding pixel values are useful for compression as they express the value "x" in terms of values already known to the decoder.

Watermark embedding done in accordance with implementations of the present invention also takes advantage of the information described by gradient values 606 and quantized gradient values 608. Instead of assisting in compression, the gradient information is used in selecting watermark locations for embedding a watermark. In particular, the higher gradient value magnitudes describe areas in an image more likely to be distorted or altered by one unit and not perceived by the human eye.

For example, gradient values 606 provide three basic calculations indicating the degree of variation for a given area under template 604. This is quantized by setting up threshold levels $T_1, T_2, T_3, -T_1, -T_2$, and $-T_3$ as illustrated in quantized gradient values 608. In one implementation that also uses keying, a quantized minimum gradient threshold selected of $q_{min}$ from 2 to 4 results in overall PSNR (peak-signal to noise ratio) measuring from 74 db to 85 db for the distortion from watermark embedding.

As illustrated in the example in FIG. 6A, one implementation of the present invention might select watermark locations using this approach indicated as $X_1, X_2, X_3, X_4, X_5, X_6, X_7, X_8$ and $X_9$ and represented by watermark location vector 610 (i.e., "X"). It is contemplated that the watermark location selection process may also require several additional considerations as part of the particular compression or other operation being performed on the pixel values being compressed and the watermark values being embedded. In JPEG-LS, for example, compression template 604 cannot properly suggest a watermark location if one of the other pixel values covered by template 604 is already identified as a watermark location. Specifically, template 604 cannot suggest using the position of "x" if any of "a", "b", "c", or "d" area have previously been identified as watermark locations. This added condition ensures that the decoder in JPEG-LS is able to properly reconstruct the same sequence of watermark locations despite the regular mode watermarking performed in accordance with implementations of the present invention.

An additional border condition also occurs when the watermark embedding inadvertently attempts to change a pixel value to an illegal value. For example, a one unit modification to a pixel valued 255 or 0 could result in illegal pixel values of 256 or −1. To resolve this issue, one implementation of the present invention checks for these conditions and performs a different modification: a 255 pixel value is decreased by two units to become 253 instead of being increased by one unit to 256 and a 0 pixel value is increased by two units to become 2 rather than being decreased by one unit to −1. The alternate values of 253 and 2 instead of 256 and −1 result in the same watermark encoding. This is because 253 mod 3 is equivalent to 256 mod 3 and 2 mode 3 is equivalent to −1 mod 3. Yet another alternative solution to this could instead use a reserved 'escape code' that simply leaves the pixel values in the blocks unchanged and signals that they should be ignored. This approach reduces watermark capacity slightly while limiting the distortion to the affected pixel value.

FIG. 6B is a schematic diagram illustrating the conversion of a watermark value in binary into a ternary representation in accordance with one implementation of the present invention. Initially, a watermark value is represented in binary by a watermark bit-sequence 612. In the illustrated implementation and example, watermark bit-sequence 612 is converted to a ternary representation as shown in watermark trit-sequence 614. Watermark trit-sequence 614 corresponds to the ternary watermark value to be embedded in one or more watermark location blocks. Using a second order Hamming code table, the ternary watermark value is divided into pairs of ternary watermark value portions that are then embedded into the pixel values associated with a watermark location block. The watermark decimal sequence 616 is provided for convenience and reference but typically not used directly to embed the watermark value.

Figure 7:
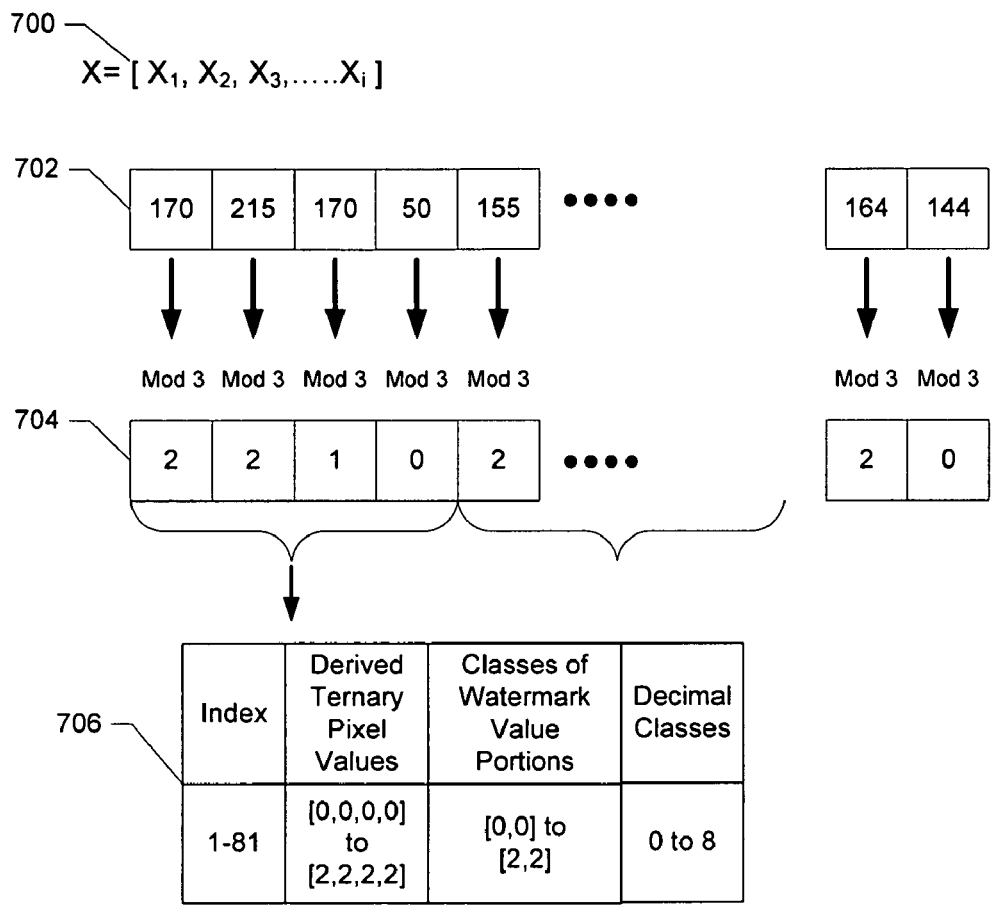
FIG. 7 is a schematic illustration of the partitioning performed on the pixel values and watermark locations in accordance with one implementation of the present invention.

FIG. 7 is a schematic illustration of the partitioning performed on pixel values and watermark locations in accordance with one implementation of the present invention. In this example, a set of watermark locations 700 (i.e., "X") identified as $X_1, X_2, X_3, \ldots X_i$ contain pixel values 702. Assuming Q=3 and using a second order Hamming code table, watermark locations 700 are partitioned into watermark location blocks of four watermark locations. For purposes of watermark embedding, each pixel value in watermark location block is processed modulo 3. The residue from this operation is used to build the resulting set of derived ternary pixel values 704 each of length 4.

Further, Hamming code table 706 outlined in this example is a second order ternary Hamming code $H_2$ with 4 derived ternary pixel values to reference 9 different cosets or classes. Pixel values 702 from watermark locations 700 modulo 3 become blocks of 4 derived ternary pixel values 704 in $F_3^n$. Any of the 9 classes or cosets can be represented by changing one value in one block of derived ternary pixel values 704 by at most one unit.

In general, an m order Hamming code table allows the derived ternary pixel values to convey one of $3^m$ watermark value portions. This m order Hamming code table has certain improved coding efficiencies when embedding watermark values under certain conditions. For example, ignoring certain border conditions in the binary representation described previously, a one unit change in a single value from pixel values 702 results in an additional $m \log_2 3 \approx 1.585$ m bits of information being available for embedding watermark values.

Figure 8:
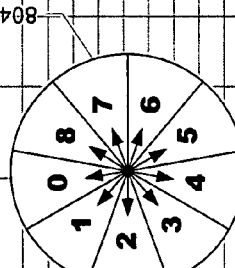
FIG. 8 is an example Hamming code table constructed in accordance with one implementation of the present invention.

FIG. 8 is an example Hamming code table constructed in accordance with one implementation of the present invention. In this example, Hamming code table 802 illustrates the second order ternary Hamming code $H_2$ of length n=4 and having 9 cosets or classes. This example sets m=2 indicating the use of a second order Hamming code. According to the general formula for determining the number of classes:

Classes=$Q^m=(Q-1)n+1$ for Q-ary

Consequently, there are $3^2$ or 9 classes in a ternary system for representing the different classes of watermark values. Pairs of ternary watermark value portions are associated with 4 derived ternary pixel values as previously described. The length n of the derived ternary pixel values when m=2 and Q=3 is derived as illustrated in the following relationship:

$$\text{Derived } Q\text{-}ary \text{ Image Value Vector length} = n = \frac{Q^m - 1}{Q - 1}$$

$$\text{and } n = \frac{3^2 - 1}{3 - 1} = 4$$

Where $m = 2$ and $Q = 3$

As illustrated in Hamming code table 802 these derived ternary pixel values describe $3^4$ or 81 different possible derived ternary pixel values from 0 to 80 and are further grouped into one of 9 different cosets. While not illustrated, an alternate implementation may use a third order ternary Hamming code table $H_3$ with m=3 and having blocks of derived ternary pixel values of length 13. By way of an enlarged Hamming code table (not illustrated) $3^{13}$ different derived pixel values instead are capable of conveying 27 different classes or cosets instead of the 9 classes when the derived ternary pixel value length was only 4. While, for simplicity, the correspondence between blocks of derived pixel values and classes is described here as an explicit table of stored values, it is also contemplated that generating the table can also be implemented through a series of computations, thus not requiring explicit storage of the table.

Hamming code table 802 illustrated in FIG. 8 has at least one important property used by implementations of the present invention. Any given derived ternary pixel value in Hamming code table 802 can be altered to represent another class of a watermark portion as illustrated schematically by class wheel 804. Given Q=3 and using a second order Hamming table, the class of the desired watermark value portion can be embedded by altering an underlying pixel value in an image by one pixel unit. For example, a block of 4 derived ternary pixel values [2,0,2,0] by default corresponds to a watermark value portion identified with class [2,1] or decimal value 5. If the watermark value to be embedded is not '2' but '8' then +1 unit is added to the underlying pixel value associated with the first derived ternary pixel value in [2,0,2,0]. The resulting block of 4 derived ternary pixel values [0,0,2,0] instead corresponds to index 18 and conveys watermark value portion identified as class [2,2] or decimal value '8'.

Figure 9:
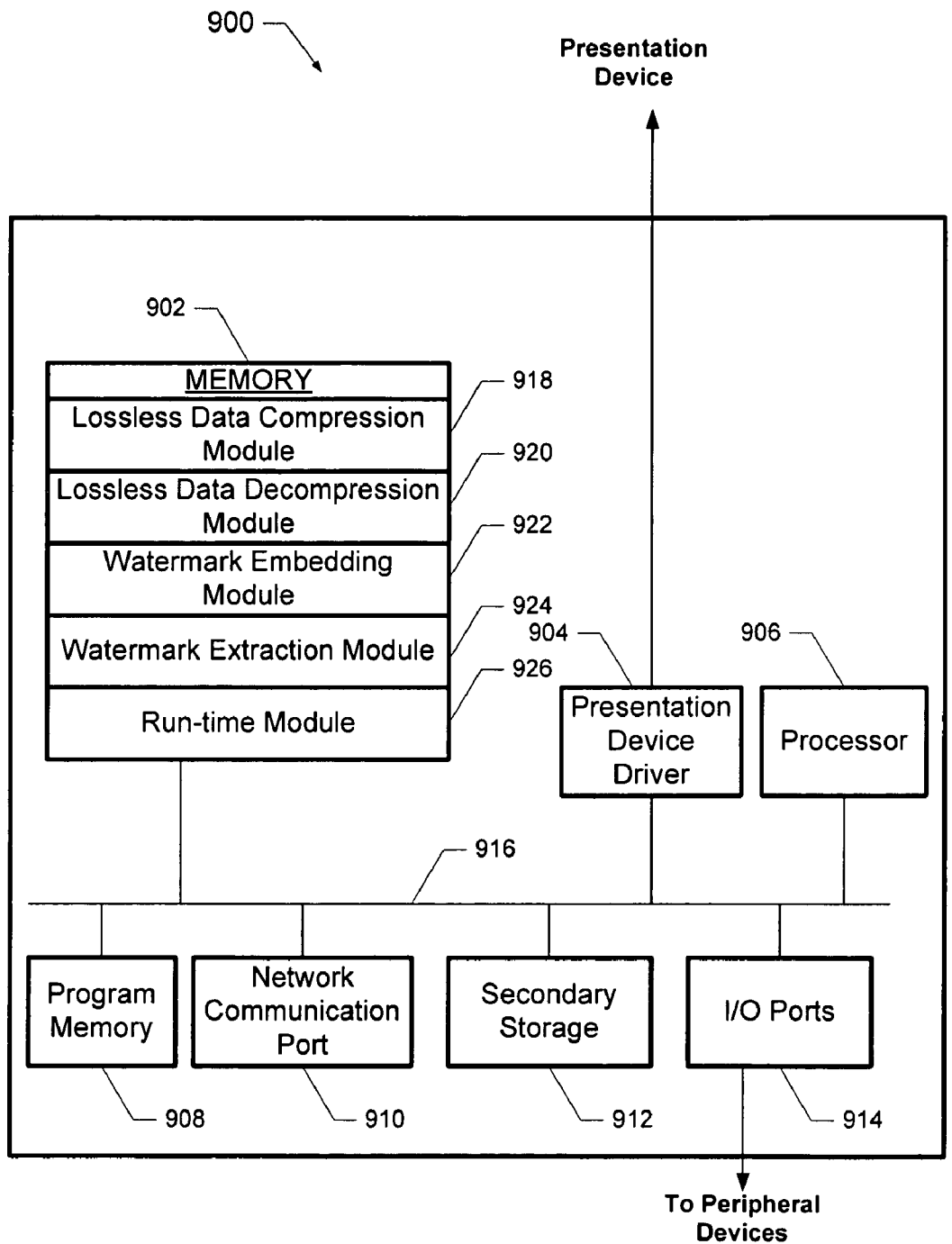
FIG. 9 is a diagram of a system used in one implementation of the present invention.

FIG. 9 is a diagram of a system 900 used in one implementation for performing the apparatus or methods of the present invention. System 900 includes a memory 902 to hold executing programs (typically random access memory (RAM) or writable read-only memory (ROM) such as a flash ROM), a presentation device driver 904 capable of interfacing and driving a display or output device, a processor 906, a program memory 908 for holding drivers or other frequently used programs, a network communication port 910 for data communication, a secondary storage 912 with secondary storage controller, and input/output (I/O) ports 914 also with I/O controller operatively coupled together over a bus 916. The system 900 can be preprogrammed, in ROM, for example, using field-programmable gate array (FPGA) technology or it can be programmed (and reprogrammed) by loading a program from another source (for example, from a floppy disk, a CD-ROM, or another computer). Also, system 900 can be implemented using customized application specific integrated circuits (ASICs).

In one implementation, memory 902 includes a lossless data compression module 918, a lossless data decompression module 920, a watermark embedding module 922, a watermark extraction module 924 and a run-time module 926 that manages system resources used when processing one or more of the above components on system 900.

As previously described, lossless data compression module 918 can be implemented using JPEG-LS or its variants, or other compression schemes. Likewise, lossless decompression module 920 is implemented using a matching scheme to decompress the previously compressed data stream. While lossless decompression module 920 does not introduce additional loss during decompression, there potentially may be a small amount of loss due to the embedding of a watermark by watermark embedding module 922 as previously described.

Watermark embedding module 922 operates in accordance with implementations of the present invention to embed a bit-sequence corresponding to a watermark as previously described and watermark extraction module 924 reverses this process and extracts the embedded watermark. In an alternate implementation, lossless data compression/decompression and watermark embedding/extraction are implemented in a single module rather than multiple separate modules to facilitate ease of use and higher levels of integration.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; CD-ROM disks and, though stored in a more transitory manner, a network such as the Internet. Any of the foregoing can be supplemented by, or incorporated in, ASICs.

Further, while specific embodiments have been described herein for purposes of illustration, various modifications may be made without departing from the spirit and scope of the invention. In one implementation, a Hamming code table is used to associate blocks of derived Q-ary data stream values to classes of Q-ary watermark values however other types of code tables can be used. For example, a Golay code table can also be used to associate blocks of derived Q-ary data stream values to classes of Q-ary watermark values. Instead of modifying one watermark location in each watermark location block, the Golay code table may require as many as two watermark locations to be modified in each watermark location block of eleven (11) ternary digits to embed a watermark value portion. Accordingly, the invention is not limited to the above-described implementations, but instead is defined by the appended claims in light of their full scope of equivalents.

What is claimed is:

1. A method of embedding a watermark value in a data stream of data stream values, comprising:

receiving the data stream on a first physical commuting device;

on the first physical computing device, identifying a set of watermark locations in the data stream, partitioning the identified set of watermark locations from the data stream into a set of watermark location blocks each watermark location block to be embedded with a watermark value portion from the watermark value, and altering a data stream value associated with a predetermined maximum number of watermark locations in one watermark location block, wherein the altering further comprises generating blocks of derived Q-ary data stream values corresponding to the set of watermark location blocks by taking residues of the data stream values modulo Q associated with the set of watermark location blocks, wherein Q represents an alphabet having Q symbol, creating a code table that associates blocks of derived Q-ary data stream values to classes of Q-ary watermark value portions, comparing a Q-ary watermark value portion to be embedded with the corresponding block of a derived Q-ary data stream values, by way of the code table, and determining whether to change the one or more data stream values associated with the predetermined maximum number of watermark locations in the one watermark location block in response to the comparison and introduce no more than the predetermined level of distortion;

on the first physical computing device, producing a transformed version of the data stream that comprises the altered data stream value; and transmitting the transformed version of the data stream from the first physical computing device to a second physical computing device.

2. The method of claim 1 wherein the watermark locations in the data stream are identified when one or more gradient values taken from a context surrounding a potential watermark location exceeds a minimum gradient variation threshold.

3. The method of claim 2 wherein the data stream corresponds to an image and further comprising compressing the data stream according to a JPEG-LS compatible compression process.

4. The method of claim 3 further comprising, during the compressing, extracting the one or more gradient values, and embedding the watermark value in the data stream based on the one or more extracted gradient values.

5. The method of claim 2 wherein the one or more gradient values taken from the context surrounding the potential watermark location indicate a variation in the data stream.

6. The method of claim 1 wherein the context surrounding the potential watermark location in the data stream is identified according to a template passing over a portion of the data stream values in conjunction with a compression operation.

7. The method of claim 1 wherein the partitioning further comprises:

generating a set of effective watermark locations from the set of watermark locations indicated by a pseudo-random sequence derived from a secret key; and creating the set of watermark location blocks to be used for embedding the watermark value from the set of effective watermark locations instead of the set of watermark locations.

8. The method of claim 7 wherein the set of watermark locations not indicated by the pseudo-random sequence have random data embedded therein.

9. The method of claim 1 wherein the code table is a Hamming code table and the predetermined maximum number of watermark locations does not exceed one watermark location per one watermark location block.

10. The method of claim 9 wherein Q is three (Q=3) and a second order ternary Hamming code uses a Hamming code table that uses blocks of 4 derived ternary data stream values to convey nine (9) different classes of ternary watermark portions while introducing the predetermined level of distortion associated with changing the datastream value by no more than one unit.

11. The method of claim 9 wherein Q is three (Q=3) and a third order ternary Hamming code uses a Hamming code table that uses blocks of 13 derived ternary data stream values to convey twenty-seven (27) different classes of ternary watermark portions while introducing the predetermined level of distortion associated with changing the datastream value by no more than one unit.

12. The method of claim 1 wherein the code table is a Golay code table and the predetermined maximum number of watermark locations does not exceed two watermark locations per one watermark location block.

13. The method of claim 1 wherein the predetermined level of distortion is expressed in a unit used to measure at least one characteristic of a data stream value in the data stream.

14. The method of claim 13 wherein the unit used to measure the at least one characteristic of the data stream value in the data stream is selected from a set of units including a pixel intensity associated with an image and a pulse code modulation (PCM) amplitude associated with an audio sample.

15. The method of claim 1 wherein the predetermined level of distortion and the watermark capacity is directly proportional to the size of an alphabet having Q symbols and used to represent the watermark value and each watermark value portion in Q-ary digits.

16. The method of claim 15 wherein the value of Q is set to a large enough value to ensure the, watermark capacity in the set of watermark location blocks is sufficient to embed the watermark value in the datastream yet not large enough to introduce unacceptable levels of distortion in the datastream.

17. The method of claim 16 wherein the order of a Hamming code is set to a small enough value to ensure the watermark capacity in the set of watermark location blocks is sufficient to embed the watermark value in the data stream.

18. The method of claim 1 wherein the Q used for Q-ary representation is selected from a set of values including: 2, 3, 4, 5, 7, 8, 9, 11, 13, a prime value, and powers of prime values.

19. A method of extracting a watermark value from a data stream of data stream values, comprising:

receiving the data stream on a first physical computing device;

on the first physical computing device, identifying a set of watermark locations in the data stream, partitioning the identified set of watermark locations from the data stream of data stream values into a set of watermark location blocks each watermark location block expected to be embedded with a watermark value portion from the watermark value, and generating the watermark value, wherein the generating comprises generating blocks of derived Q-ary data stream values corresponding to the set of watermark location blocks by taking residues of the data stream values modulo Q associated with the set of watermark location blocks, wherein Q represents an alphabet having Q symbols, creating a code table that associates blocks of derived Q-ary data stream values to classes of Q-ary watermark value portions, cross referencing each block of a derived Q-ary data stream value with the class of a Q-ary watermark value portion by way of the code table, and combining the one or more Q-ary watermark value portions together into the watermark value;

on the first physical computing device, producing a transformed version of the data stream; and transmitting the transformed version of the data stream from the first physical computing device to a second physical computing device.

20. The method of claim 19 wherein the set of watermark locations are identified when one or more gradient values taken from a context surrounding a potential watermark location exceed a minimum gradient variation threshold.

21. The method of claim 20 wherein the data stream corresponds to an image that is compressed according to a JPEG-LS compatible compression process, and the producing comprises decompressing the data stream according to the JPEG-LS compatible process.

22. The method of claim 21 further comprising, during the decompressing, extracting the one or more gradient values from the data stream, and wherein the generating comprises generating the watermark value based on the one or more extracted gradient values.

23. The method of claim 22 wherein the context surrounding the potential watermark location in the data stream is identified according to a template passing over a portion of the data stream values in conjunction with a compression operation.

24. The method of claim 20 wherein the one or more gradient values taken from the context surrounding the potential watermark location indicate a variation in the data stream.

25. The method of claim 21 wherein the minimum gradient variation threshold is inversely proportional to the predetermined level of distortion.

26. The method of claim 19 wherein the partitioning further comprises:

generating a set of effective watermark locations from the set of watermark locations indicated by a pseudo-random sequence derived from a secret key; and creating the set of watermark location blocks expected to be used for embedding the watermark value from the set of effective watermark locations instead of the set of watermark locations.

27. The method of claim 26 wherein the set of watermark locations not indicated by the pseudo-random sequence are ignored.

28. The method of claim 19 wherein the code table is a Hamming code table.

29. The method of claim 19 wherein the code table is a Golay code table.

30. The method of claim 19 wherein Q is three (Q=3) and a second order ternary Hamming code uses a Hamming code table that uses blocks of 4 derived ternary data stream values to convey nine (9) different classes of watermark value portions while introducing the predetermined level of distortion associated with changing the datastream value by no more than one unit.

31. The method of claim 19 wherein Q is three (Q=3) and a third order ternary Hamming code uses a Hamming code table that uses blocks of 13 derived ternary data stream values to convey twenty-seven (27) different classes of watermark value portions while introducing the predetermined level of distortion associated with changing the datastream value by no more than one unit.

32. The method of claim 19 wherein the Q used for Q-ary representation is selected from a set of values including: 2, 3, 4, 5, 7, 8, 9, 11, 13, a prime value, and powers of prime values.

33. A computer-readable medium storing a computer program for embedding a watermark value in a data stream of data stream values, comprising instructions operable to cause a programmable processor to perform operations comprising:

identifying a set of watermark locations in the data stream;

partitioning the identified set of watermark locations from the data stream into a set of watermark location blocks each watermark location block to be embedded with a watermark value portion from the watermark value; and altering a data stream value associated with a predetermined maximum number of watermark locations in one watermark location block, wherein in the altering the instructions cause the programmable processor to perform operations comprising generating blocks of derived Q-ary data stream values corresponding to the set of watermark location blocks by taking residues of the data stream values modulo Q associated with the set of watermark location blocks, wherein Q represents an alphabet having Q symbols;

creating a code table that associates blocks of derived Q-ary data stream values to classes of Q-ary watermark value portions;

comparing a Q-ary watermark value portion to be embedded with the corresponding block of a derived Q-ary data stream values, by way of the code table; and determining whether to change the one or more data stream values associated with the predetermined maximum number of watermark locations in the one watermark location block in response to the comparison and introduce no more than the predetermined level of distortion.

34. The computer-readable medium of claim 33 wherein the data stream uses a compression implemented according to a JPEG-LS compatible compression operation.

35. The computer-readable medium of claim 33 wherein the code table is a Hamming code table and the predetermined maximum number of watermark locations does not exceed one watermark location per one watermark location block.

36. The computer-readable medium of claim 33 wherein the predetermined level of distortion is expressed in a unit used to measure at least one characteristic of a data stream value in the data stream and selected from a set of units including a pixel intensity associated with an image and a pulse code modulation (PCM) amplitude associated with an audio sample.

37. A computer-readable medium storing a computer program for extracting a watermark value in a data stream of data stream values, comprising instructions operable to cause a programmable processor to perform operation comprising:

identifying a set of watermark locations in the data stream;

partitioning the identified set of watermark locations from the data stream of data stream values into a set of watermark location blocks each watermark location block expected to be embedded with a watermark value portion from the watermark value; and generating the watermark value, wherein in the generating the instructions cause the programmable processor to perform operations comprising generating blocks of derived Q-ary data stream values corresponding to the set of watermark location blocks by taking residues of the data stream values modulo Q associated with the set of watermark location blocks, wherein Q represents an alphabet having Q symbols;

creating a code table that associates blocks of derived Q-ary data stream values to classes of Q-ary watermark value portions;

cross-referencing each block of a derived Q-ary data stream value with the class of a Q-ary watermark value portion by way of the code table; and combining the one or more Q-ary watermark value portions together into the watermark value.

38. The computer-readable medium of claim 37 wherein the set of watermark locations are identified when one or more gradient values taken from a context surrounding a potential watermark location exceed a minimum gradient variation threshold.

39. The computer-readable medium of claim 37 wherein the data stream uses a compression implemented according to a JPEG-LS compatible compression operation.

40. The computer-readable medium of claim 37 wherein the partitioning further comprises:

generating a set of effective watermark locations from the set of watermark locations indicated by a pseudo-random sequence derived from a secret key; and creating the set of watermark location blocks expected to be used for embedding the watermark value from the set of effective watermark locations instead of the set of watermark locations.

41. The computer-readable medium of claim 37 wherein the code table is a Hamming code table.

42. An apparatus for embedding a watermark value in a data stream of data stream values, comprising:

a processor capable of executing instructions;

a memory containing instructions that, when executed by the processor, cause the processor to perform operations comprising identifying a set of watermark locations in the data stream, partitioning the identified set of watermark locations from the data stream into a set of watermark location blocks each watermark location block to be embedded with a watermark value portion from the watermark value, and altering a data stream value associated with a predetermined maximum number of watermark locations in one watermark location block, wherein in the altering the instructions cause the processor to perform operations comprising generating blocks of derived Q-ary data stream values corresponding to the set of watermark location blocks by taking residues of the data stream values modulo Q associated with the set of watermark location blocks, wherein Q represents an alphabet having Q symbols;

creating a code table that associates blocks of derived Q-ary data stream values to classes of Q-ary watermark value portions;

comparing a Q-ary watermark value portion to be embedded with the corresponding block of a derived Q-ary data stream values, by way of the code table; and determining whether to change the one or more data stream values associated with the predetermined maximum number of watermark locations in the one watermark location block in response to the comparison and introduce no more than the predetermined level of distortion.

43. An apparatus for extracting a watermark value from a data stream of data stream values, comprising:

a processor capable of executing instructions;

a memory containing instructions that, when executed by the processor, cause the processor to perform operations comprising identifying a set of watermark locations in the data stream, partitioning the identified set of watermark locations from the data stream of data stream values into a set of watermark location blocks each watermark location block expected to be embedded with a watermark value portion from the watermark values, and generating the watermark value, wherein in the generating the instructions cause the processor to perform operations comprising generating blocks of derived Q-ary data stream values corresponding to the set of watermark location blocks by taking residues of the data stream values modulo Q associated with the set of watermark location blocks, wherein Q represents an alphabet having Q symbols;

creating a code table that associates blocks of derived Q-ary data stream values to classes of Q-ary watermark value portions;

cross-referencing each block of a derived Q-ary data stream value with the class of a Q-ary watermark value portion by way of the code table; and combining the one or more Q-ary watermark value portions together into the watermark value.

44. An apparatus for embedding a watermark value in a data stream of data stream values, comprising:

means for identifying a set of watermark locations in the data stream;

means for partitioning the identified set of watermark locations from the data stream into a set of watermark location blocks each watermark location block to be embedded with a watermark value portion from the watermark value; and means for altering a data stream value associated with a predetermined maximum number of watermark locations in one watermark location block wherein altering the data stream further comprises a means for generating blocks of derived Q-ary data stream values corresponding to the set of watermark location blocks by taking residues of the data stream values modulo Q associated with the set of watermark location blocks, wherein Q represents an alphabet having Q symbols;

creating a code table that associates blocks of derived Q-ary data stream values to classes of Q-ary watermark value portions;

comparing a Q-ary watermark value portion to be embedded with the corresponding block of a derived Q-ary data stream values, by way of the code table; and determining whether to change the one or more data stream values associated with the predetermined maximum number of watermark locations in the one watermark location block in response to the comparison and introduce no more than the predetermined level of distortion.

45. An apparatus for extracting a watermark value from a data stream of data stream values, comprising:

means for identifying a set of watermark locations in the data stream;

means for partitioning the identified set of watermark locations from the data stream of data stream values into a set of watermark location blocks each watermark location block expected to be embedded with a watermark value portion from the watermark value; and means for generating the watermark value by further, generating blocks of derived Q-ary data stream values corresponding to the set of watermark location blocks by taking residues of the data stream values modulo Q associated with the set of watermark location blocks, wherein Q represents an alphabet having Q symbols, creating a code table that associates blocks of derived Q-ary data stream values to classes of Q-ary watermark value portions, cross referencing each block of a derived Q-ary data stream value with the class of a Q-ary watermark value portion by way of the code table and combining the one or more Q-ary watermark value portions together into the watermark value.

* * * * *

UNITED STATES PATENT AND TRADEMARK OFFICE
CERTIFICATE OF CORRECTION

PATENT NO. : 7,570,782 B2  Page 1 of 1
APPLICATION NO. : 11/010035
DATED : August 4, 2009
INVENTOR(S) : Gadiel Seroussi et al.

It is certified that error appears in the above-identified patent and that said Letters Patent is hereby corrected as shown below:

In column 16, line 66, in Claim 1, delete "commuting" and insert -- computing --, therefor.

In column 17, line 15, in Claim 1, delete "symbol," and insert -- symbols, --, therefor.

In column 18, line 37, in Claim 16, delete "the," and insert -- the --, therefor.

In column 19, line 34, in Claim 25, delete "claim 21" and insert -- claim 20 --, therefor.

In column 20, line 53, in Claim 37, delete "operation" and insert -- operations --, therefor.

In column 22, line 4, in Claim 43, delete "values," and insert -- value, --, therefor.

Signed and Sealed this

Thirteenth Day of April, 2010

David J. Kappos
*Director of the United States Patent and Trademark Office*